Patented June 28, 1938

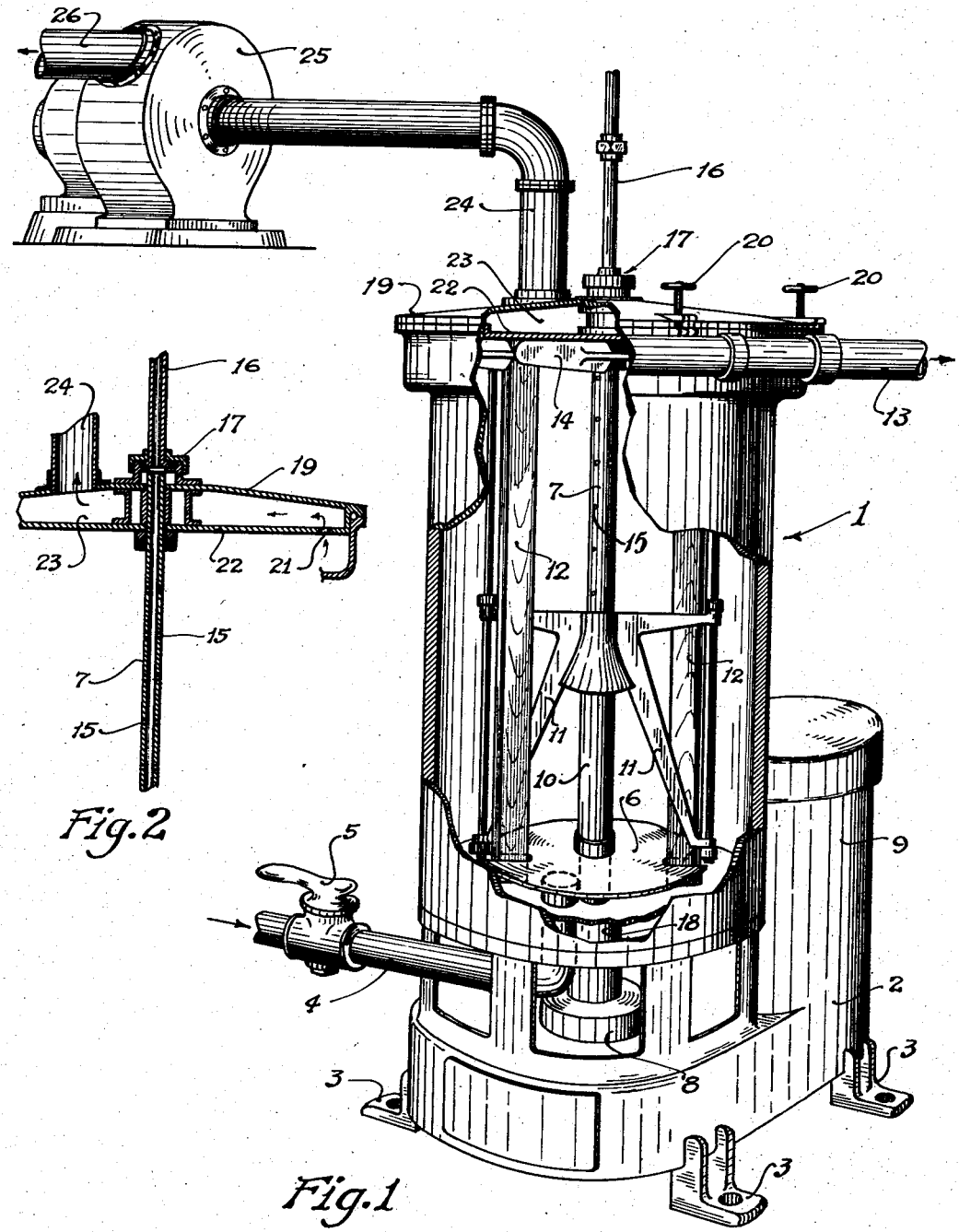

2,122,029

UNITED STATES PATENT OFFICE 2,122,029

METHOD OF DEODORIZING

Elmer M. Davis, Chicago, Ill., assignor to Industrial Patents Corporation, Chicago, Ill., a corporation of Delaware Application December 29, 1934, Serial No. 759,623

11 Claims. (Cl. 99—61)

This invention relates to a method for deodorizing a fluid.

One of the objects of the invention is to provide a method for removing objectionable odors from a fluid.

Another object of the invention is to provide a method for removing objectionable odors from cream.

Another object of the invention is to remove onion odors and flavors from cream.

Other objects of the invention will be apparent from the description and claims which follow.

During portions of the pasturing season large quantities of cream are received at creameries from which an inferior grade of butter is produced due to flavors and odors derived from onions, strong grasses, weeds and the like consumed by the cows. Careless handling, improper storage and the like also result in the development of unpleasant, undesirable flavors and odors in cream, many of which are carried over into the butter churned from the cream.

My copending application entitled Method of deodorizing milk and cream, Serial No. 741,483, filed August 25, 1934, describes a high temperature method of deodorizing fluids such as milk and cream. However, it is sometimes desired not to subject the fluid to the extremely high temperatures disclosed in my said copending application and the present invention involves a method of deodorizing by the use of live steam which does not involve heating the cream to extremely high temperatures.

The method of the present invention has been found to be effective in the removal of many of the objectionable odors found in cream, which odors are carried over into butter churned from the cream unless removed before the cream is churned.

The apparatus employed in the method of the present invention is described and claimed in my copending divisional application Serial No. 18,628, filed April 27, 1935, entitled Deodorizer, which application issued June 22, 1937 as Patent No. 2,084,894.

The invention may be better understood by reference to the accompanying drawing in which similar reference characters in the figures identify similar parts.

Figure 1 is a perspective view showing one form of apparatus which may be employed in the method of the present invention.

Figure 2 is a sectional detail view of the top of the deodorizing device shown in Figure 1.

As will be seen from the description which follows, the method of the present invention may be carried out with a modified flash pasteurizer comprising a closed cylinder having a centrally located drive shaft supporting an agitator and scraper blades. The drive shaft is drilled with a plurality of holes to admit steam under pressure.

The cream swirling upwardly on the inner wall of the cylinder in the form of a thin film is treated by impinging a jet of gas emitted by the holes in the drive shaft.

The cream is introduced into the device at a temperature of about 185° Fahrenheit, which is ordinary pasteurizing temperature, the temperature of the cream being raised by the steam to about 210° Fahrenheit.

The invention may be more clearly understood by reference to the drawing:

Deodorizer 1 is mounted upon housing 2 supported by feet 3. Cream at pasteurizing temperature is admitted to deodorizer 1 through line 4 provided with valve 5. The cream enters under pressure and impinges against baffle plate 6. Shaft 7 is driven through gear box 8 by a motor, not shown, mounted in the portion 9 of the housing 2. Dasher sleeve 10 is mounted upon and rotates with shaft 7. Dasher arms 11 affixed to dasher sleeve 10 carry dasher blades 12 which in operation cause the liquid to be swirled upwardly and driven out through line 13 by impeller blades 14 which are also mounted upon shaft 7 and rotate therewith.

As will be seen by reference to Figure 2, shaft 7 is provided with a plurality of holes 15 through which jets of steam are directed against the inside wall of deodorizer 1 to treat the film of cream swirling upwardly thereon when the device is in operation. Steam is provided to shaft 7 through line 16 from a source not shown. The steam enters at packing gland 17. It will be understood, of course, that a packing gland is also provided at 18.

Deodorizer 1 is provided with a cover 19 which may be fixed to the top of deodorizer 1 as by screws 20. Steam and odors escape from the deodorizer 1 through a plurality of holes 21 in the lower plate 22 of cover 19 and pass from chamber 23 through line 24, exhaust fan 25 and line 26 to the outer atmosphere.

The device of the present invention provides an unusually efficacious apparatus which is inexpensive to construct and simple in operation, being dependent for its success upon the direct impingement of live steam upon a moving film of cream and not upon the use of unusual pressures or of a vacuum.

In practice I prefer to add buttermilk to cream in sufficient quantities to thin the cream down to about twenty-five per cent butter fat, at which consistency I have found that the undesirable odors volatilize more readily.

The method of the present invention may be used to entirely deodorize cream tainted with numerous types of odors and may be used as auxiliary to other deodorizing methods in the case of odors which are extremely tenacious and difficult to dissipate.

The method of the present invention may be carried out successfully without danger of the development of cooked or burned flavors or of caramelizing the milk sugar.

It will be noted that in the preferred manner of carrying out the invention the cream is preheated to pasteurizing temperature and is at a pasteurizing temperture when treated with the live steam and that consequently the steam treatment does not involve any violent temperature changes.

Although the present invention has been described as employed with deodorizing cream it will be understood that it may be used for the treatment of any fluid from which it is desired to draw off odors in the form of volatile gases.

After treatment in the deodorizer, the cream or fluid is drawn off and cooled in any desired manner preparatory to churning or other treatment.

I claim:

1. The method of deodorizing fluid which comprises preheating the fluid, causing the fluid to travel in a thin film, impinging jets of steam against said travelling film of fluid and immediately and continuously removing steam and volatile gases.

2. The method of deodorizing fluid which comprises heating the fluid to flash pasteurizing temperature, causing the preheated fluid to travel in the form of a film, impinging jets of steam against said film of fluid and immediately and continuously drawing off steam and volatile gases.

3. The method of deodorizing fluid which comprises heating the fluid to flash pasteurizing temperature, conducting the fluid into an open chamber, causing the fluid to travel over the inner surface of the said chamber in the form of a film, impinging jets of steam against said travelling film of fluid and immediately and continuously drawing off steam and volatile gases.

4. The method of deodorizing cream which comprises heating the cream to flash pasteurizing temperature, conducting the cream into an open chamber, causing the cream to travel over the inner surface of the said chamber in the form of a film, impinging jets of steam against said travelling film of cream and immediately and continuously drawing off steam and volatile gases from said chamber.

5. The method of deodorizing cream which comprises passing the cream in the form of a film under pressure through a chamber, impinging jets of steam against the moving film of cream while in said chamber, and immediately and continuously drawing off steam and volatile gases separately from the cream.

6. The method of deodorizing cream which comprises heating the cream to flash pasteurizing temperature, conveying the heated cream to an open chamber, forcibly impinging the cream against a baffle plate in the bottom of said chamber, swirling the cream up the walls of the chamber in the form of a moving film, impinging jets of steam against said moving film, drawing off steam and volatile gases and conveying said cream from said chamber.

7. The method of deodorizing cream which comprises heating the cream to flash pasteurizing temperature, conveying the heated cream to an open chamber, forcibly impinging the cream against a baffle plate in the bottom of said chamber, swirling the cream up the walls of the chamber in the form of a moving film, impinging jets of steam against said moving film, drawing off steam and volatile gases and conveying said cream from said chamber, and thereafter cooling the said cream.

8. The method of deodorizing cream which comprises preheating the cream to flash pasteurizing temperature, moving the cream in the form of a thin film over the walls of an open chamber and impinging jets of steam against said moving film of cream in sufficient quantities to raise the temperature of the cream to approximately 210° Fahrenheit, drawing off steam and volatile gases and conveying said cream from said chamber.

9. The method of deodorizing cream which comprises preheating the cream, causing the cream to travel in a thin film, impinging jets of steam against the travelling film of cream and immediately and continuously removing steam and volatile gases.

10. The method of deodorizing cream which comprises heating the cream to flash pasteurizing temperature, causing the preheated cream to travel in the form of a film, impinging jets of steam against the film of cream and immediately and continuously drawing off steam and volatile gases.

11. The method of deodorizing fluid which comprises heating the fluid to flash pasteurizing temperature, conveying the heated fluid to an open chamber, forcibly impinging the fluid against a baffle plate in the bottom of the chamber, swirling the fluid up the walls of the chamber in the form of a moving film, impinging jets of steam against the moving film, drawing off steam and volatile gases and conveying the fluid from the chamber.

ELMER M. DAVIS.